US008452325B2

(12) United States Patent
McCann (10) Patent No.: US 8,452,325 B2
(45) Date of Patent: May 28, 2013

(54) METHODS, SYSTEMS, AND COMPUTER READABLE MEDIA FOR PROVIDING SCALABLE NUMBER PORTABILITY (NP) HOME LOCATION REGISTER (HLR)

(75) Inventor: Thomas M. McCann, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 410 days.

(21) Appl. No.: 12/777,853

(22) Filed: May 11, 2010

(65) Prior Publication Data
US 2010/0285800 A1 Nov. 11, 2010

Related U.S. Application Data (60) Provisional application No. 61/177,096, filed on May 11, 2009.

(51) Int. Cl.
H04M 1/00 (2006.01)
(52) U.S. Cl.
USPC .......................................................... 455/551
(58) Field of Classification Search
USPC .......................................................... 455/551
See application file for complete search history.

(56) References Cited

U.S. PATENT DOCUMENTS

| 4,310,727 | A | 1/1982 | Lawser |
| 4,754,479 | A | 6/1988 | Bicknell et al. |
| 4,819,156 | A | 4/1989 | DeLorme et al. |
| 5,089,954 | A | 2/1992 | Rago |
| 5,237,604 | A | 8/1993 | Ryan |
| 5,247,571 | A | 9/1993 | Kay et al. |
| 5,251,248 | A | 10/1993 | Tokunaga et al. |
| 5,400,390 | A | 3/1995 | Salin |
| 5,422,941 | A | 6/1995 | Hasenauer et al. |
| 5,423,068 | A | 6/1995 | Hecker |
| 5,430,719 | A | 7/1995 | Weisser, Jr. |
| 5,442,683 | A | 8/1995 | Hoogeveen |
| 5,455,855 | A | 10/1995 | Hokari |

(Continued)

FOREIGN PATENT DOCUMENTS

| CN | 1968267 A | 5/2007 |
| EP | 0 512 962 A2 | 11/1992 |

(Continued)

OTHER PUBLICATIONS

Official Action for U.S. Appl. No. 11/982,549 (Feb. 24, 2011).

(Continued)

Primary Examiner — Nathan Mitchell
(74) Attorney, Agent, or Firm — Jenkins, Wilson, Taylor & Hunt, P.A.

(57) ABSTRACT

The subject matter described herein includes methods, systems, and computer readable media for providing NP-HLR functionality. According to one aspect, the subject matter described herein includes a system for providing scalable NP-HLR. The system includes an NP front end node for receiving requests for routing information for ported-in and non-ported foreign mobile subscribers, for making portability determinations in response to the requests, for processing or routing the requests based on the portability determinations, and for receiving and responding to provide roaming number requests for ported-out mobile subscribers. The system further includes at least one HLR back end node for performing HLR functions for ported-in foreign mobile subscribers including receiving, from the NP front end node, the requests for routing information for the ported-in foreign mobile subscribers and for responding to the requests with the routing information for the ported-in foreign mobile subscribers.

18 Claims, 6 Drawing Sheets

U.S. PATENT DOCUMENTS

| | | | |
|---|---|---|---|
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,839,421 B2 | 1/2005 | Ferraro Esparza et al. |
| 6,871,070 B2 | 3/2005 | Ejzak |
| 6,885,872 B2 | 4/2005 | McCann et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,010,002 B2 | 3/2006 | Chow et al. |
| 7,027,433 B2 * | 4/2006 | Tuohino et al. ............ 370/352 |
| 7,027,582 B2 | 4/2006 | Khello et al. |
| 7,035,239 B2 | 4/2006 | McCann et al. |
| 7,039,037 B2 | 5/2006 | Wang et al. |
| 7,054,652 B2 | 5/2006 | Luis |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,092,505 B2 | 8/2006 | Allison et al. |
| 7,170,982 B2 | 1/2007 | Li et al. |
| 7,221,952 B2 | 5/2007 | Cho et al. |
| 7,274,683 B2 | 9/2007 | Segal |
| 7,286,839 B2 | 10/2007 | McCann et al. |
| 7,366,530 B2 | 4/2008 | McCann et al. |
| 7,397,773 B2 | 7/2008 | Qu et al. |
| 7,415,007 B2 | 8/2008 | Huang |
| 7,457,283 B2 | 11/2008 | Dalton, Jr. et al. |
| 7,551,608 B1 | 6/2009 | Roy |
| 7,627,108 B1 | 12/2009 | Enzmann et al. |
| 7,660,287 B2 | 2/2010 | Axelsson et al. |
| 7,693,135 B2 | 4/2010 | Pershan |
| 7,715,367 B2 | 5/2010 | Nishida et al. |
| 7,746,864 B1 | 6/2010 | Asawa et al. |
| 7,751,386 B2 | 7/2010 | Kobayashi et al. |
| 7,756,518 B2 * | 7/2010 | Xu et al. ....................... 455/445 |
| 7,787,445 B2 | 8/2010 | Marsico |
| 7,889,716 B2 | 2/2011 | Tejani et al. |
| 7,996,541 B2 | 8/2011 | Marathe et al. |
| 2001/0008532 A1 | 7/2001 | Lee |
| 2001/0029182 A1 * | 10/2001 | McCann et al. ............. 455/433 |
| 2001/0030957 A1 | 10/2001 | McCann et al. |
| 2001/0040957 A1 | 11/2001 | McCann et al. |
| 2001/0055380 A1 | 12/2001 | Benedyk et al. |
| 2002/0054674 A1 | 5/2002 | Chang et al. |
| 2002/0095421 A1 | 7/2002 | Koskas |
| 2002/0114440 A1 | 8/2002 | Madour et al. |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2002/0176562 A1 | 11/2002 | Hao |
| 2003/0007482 A1 | 1/2003 | Khello et al. |
| 2003/0013464 A1 * | 1/2003 | Henry-Labordere et al. 455/466 |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0128693 A1 | 7/2003 | Segal |
| 2003/0181206 A1 * | 9/2003 | Zhou et al. .................. 455/432.3 |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0053604 A1 * | 3/2004 | Ratilainen et al. ......... 455/414.2 |
| 2004/0053610 A1 * | 3/2004 | Kim ........................... 455/432.1 |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0125925 A1 | 7/2004 | Marsot |
| 2004/0141488 A1 | 7/2004 | Kim et al. |
| 2004/0142707 A1 | 7/2004 | Midkiff et al. |
| 2004/0196963 A1 | 10/2004 | Appelman et al. |
| 2004/0198351 A1 | 10/2004 | Knotts |
| 2004/0202187 A1 | 10/2004 | Kelly et al. |
| 2004/0243596 A1 | 12/2004 | Lillqvist et al. |
| 2004/0246965 A1 | 12/2004 | Westman et al. |
| 2005/0100145 A1 | 5/2005 | Spencer et al. |
| 2005/0101297 A1 | 5/2005 | Delaney et al. |
| 2005/0119017 A1 | 6/2005 | Lovell, Jr. et al. |
| 2005/0143075 A1 * | 6/2005 | Halsell ........................ 455/445 |
| 2005/0182781 A1 | 8/2005 | Bouvet |
| 2005/0251509 A1 | 11/2005 | Pontius |
| 2005/0286531 A1 | 12/2005 | Tuohino et al. |
| 2006/0002308 A1 | 1/2006 | Na et al. |
| 2006/0034256 A1 | 2/2006 | Addagatla et al. |
| 2006/0067338 A1 | 3/2006 | Hua et al. |
| 2006/0072726 A1 | 4/2006 | Klein et al. |
| 2006/0077957 A1 | 4/2006 | Reddy et al. |

| | | | |
|---|---|---|---|
| 2006/0095575 A1 | 5/2006 | Sureka et al. | |
| 2006/0098621 A1 | 5/2006 | Plata et al. | |
| 2006/0136557 A1 | 6/2006 | Schaedler et al. | |
| 2006/0165068 A1 | 7/2006 | Dalton et al. | |
| 2006/0225128 A1 | 10/2006 | Aittola et al. | |
| 2006/0245573 A1 | 11/2006 | Sheth et al. | |
| 2006/0293021 A1 | 12/2006 | Zhou | |
| 2007/0019625 A1 | 1/2007 | Ramachandran et al. | |
| 2007/0061397 A1 | 3/2007 | Gregorat et al. | |
| 2007/0104184 A1 | 5/2007 | Ku et al. | |
| 2007/0115934 A1 | 5/2007 | Dauster et al. | |
| 2007/0116250 A1 | 5/2007 | Stafford | |
| 2007/0121879 A1 | 5/2007 | McGary et al. | |
| 2007/0133574 A1 | 6/2007 | Tejani et al. | |
| 2007/0133757 A1 | 6/2007 | Girouard et al. | |
| 2007/0203909 A1 | 8/2007 | Marathe | |
| 2007/0243876 A1 | 10/2007 | Duan | |
| 2007/0286379 A1 | 12/2007 | Wiatrowski et al. | |
| 2008/0019356 A1 | 1/2008 | Marsico | |
| 2008/0037759 A1* | 2/2008 | Chin et al. | 379/221.13 |
| 2008/0051036 A1 | 2/2008 | Vaswani et al. | |
| 2008/0084975 A1 | 4/2008 | Schwartz | |
| 2008/0114862 A1 | 5/2008 | Moghaddam et al. | |
| 2008/0130856 A1 | 6/2008 | Ku et al. | |
| 2008/0137832 A1 | 6/2008 | Heinze et al. | |
| 2008/0171544 A1* | 7/2008 | Li et al. | 455/432.1 |
| 2008/0247526 A1 | 10/2008 | Qiu et al. | |
| 2008/0281975 A1 | 11/2008 | Qiu et al. | |
| 2008/0311917 A1 | 12/2008 | Marathe et al. | |
| 2009/0022146 A1 | 1/2009 | Huang | |
| 2009/0043704 A1 | 2/2009 | Bantukul et al. | |
| 2009/0103707 A1 | 4/2009 | McGary et al. | |
| 2009/0193071 A1 | 7/2009 | Qiu et al. | |
| 2009/0227276 A1 | 9/2009 | Agarwal et al. | |
| 2009/0264112 A1 | 10/2009 | De Zen et al. | |
| 2010/0020728 A1 | 1/2010 | Jefferson et al. | |
| 2010/0042525 A1 | 2/2010 | Cai et al. | |
| 2010/0177780 A1 | 7/2010 | Ophir et al. | |
| 2010/0284336 A1 | 11/2010 | Rui et al. | |
| 2010/0299451 A1 | 11/2010 | Yigang et al. | |
| 2011/0116382 A1 | 5/2011 | McCann et al. | |
| 2011/0126277 A1 | 5/2011 | McCann et al. | |
| 2012/0236871 A1 | 9/2012 | Wallace et al. | |

FOREIGN PATENT DOCUMENTS

| | | |
|---|---|---|
| EP | 0 936 825 A3 | 8/1999 |
| EP | 0 944 276 A1 | 9/1999 |
| EP | 1 285 545 B1 | 10/2004 |
| EP | 1 558 004 A | 7/2005 |
| EP | 1 742 452 A1 | 1/2007 |
| EP | 1 958 399 B1 | 2/2012 |
| KR | 2000-0037801 | 7/2000 |
| KR | 10-1998-0052565 | 5/2001 |
| KR | 2003-0040291 A1 | 5/2003 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/18269 | 4/1998 |
| WO | WO 98/56195 | 12/1998 |
| WO | WO 99/11087 A2 | 3/1999 |
| WO | WO 99/57926 | 11/1999 |
| WO | WO 00/16583 | 3/2000 |
| WO | WO 00/60821 | 10/2000 |
| WO | WO 01/47297 A2 | 6/2001 |
| WO | WO 01/48981 A1 | 7/2001 |
| WO | WO 01/54444 A1 | 7/2001 |
| WO | WO 03/005664 A2 | 1/2003 |
| WO | WO 03/021982 A1 | 3/2003 |
| WO | WO 03/105382 A1 | 12/2003 |
| WO | WO 2004/006534 A1 | 1/2004 |
| WO | WO 2004/008786 A1 | 1/2004 |
| WO | WO 2004/075507 A2 | 9/2004 |
| WO | WO 2004/102345 A2 | 11/2004 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/146257 A2 | 12/2007 |
| WO | WO 2008/011101 A2 | 1/2008 |
| WO | WO 2008/073226 | 6/2008 |
| WO | WO 2008/157213 A2 | 12/2008 |
| WO | WO 2009/023573 A2 | 2/2009 |
| WO | WO 2009/070179 A1 | 6/2009 |
| WO | WO 2011/047382 A2 | 4/2011 |
| WO | WO 2012/129171 A2 | 9/2012 |

OTHER PUBLICATIONS

"Ericsson Unified Number Portability," (Downloaded from the Internet on Jan. 24, 2011).

Chinese Official Action for Chinese Patent Application No. 200680051295.9 (Dec. 24, 2010).

Notification of Transmittal of the International Search Report and the Written Opinion of the International Searching Authority, or the Declaration for International Application No. PCT/US2010/034372 (Nov. 30, 2010).

Commonly assigned, co-pending U.S. Appl. No. 12/906,998 for, "Methods, Systems, and Computer Readable Media for Providing Diameter Signaling Router with Firewall Functionality," (Unpublished, filed on Oct. 18, 2010).

Commonly assigned, co-pending U.S. Appl. No. 12/906,816 for, "Methods, Systems, and Computer Readable Media for Providing Diameter Signaling Router With Integrated Monitoring Functionality," (Unpublished, filed on Oct. 18, 2010).

Notice of Allowance and Fee(s) Due for U.S. Appl. No. 11/291,502 (Oct. 5, 2010).

Official Action for U.S. Appl. No. 11/888,907 (Sep. 16, 2010).

Communication pursuant to Article 94(3) EPC for European application No. 07810606.9 (Aug. 26, 2010).

Official Action for U.S. Appl. No. 11/635,406 (Aug. 26, 2010).

Communication pursuant to Article 94(3) EPC for European application No. 03734522.0 (Aug. 19, 2010).

Communication Pursuant to Article 94(3) EPC for European Application No. 06844747.7 (May 11, 2010).

Notice of Allowance and Fee(s) Due for U.S. Appl. No. 11/879,737 (Apr. 22, 2010).

Supplemental European Search Report for European application No. 03734522.0 (Feb. 23, 2010).

Communication pursuant to Article 94(3) EPC for European application No. 07810606.9 (Feb. 12, 2010).

Final Official Action for U.S. Appl. No. 11/291,502 (Feb. 4, 2010).

Supplementary European Search Report for European application No. 07810606.9 (Nov. 23, 2009).

Supplementary European Search Report for European Patent No. 1676386 (Oct. 30, 2009).

Notification of Transmittal of the International Search Report and The Written Opinion of the International Searching Authority, or the Declaration for International application No. PCT/US2009/036538 (Sep. 30, 2009).

Non-Final Official Action for U.S. Patent Application No. 11/879,737 (Sep. 30, 2009).

"$3_{rd}$ Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 9)," 3GPP TS 29.272, V9.0.0, pp. 1-71 (Sep. 2009).

Supplementary European Search Report for European Application No. 04751843.6 (Aug. 7, 2009).

Communication pursuant to Article 94(3) EPC for European Application No. 06844747.3 (Jul. 28, 2009).

Notification Concerning Transmittal of International Preliminary Report on Patentability for International Application No. PCT/US2007/024418 (Jun. 18, 2009).

Final Official Action for U.S. Appl. No. 11/879,737 (Jun. 9, 2009).

Official Action for U.S. Appl. No. 11/291,502 (May 13, 2009).

Supplementary European Search Report for European Application No. 06844747.3 (Apr. 24, 2009).

Notification of Transmittal of the International Search Report and the Written Opinion of the International Searching Authority, or the Declaration for International Application No. PCT/US2008/072641 (Feb. 24, 2009).

Notification of Transmittal of the International Search Report and the Written Opinion of the International Searching Authority, or the Declaration for International Application No. PCT/US2008/066675 (Dec. 9, 2008).

Notification Concerning Transmittal of International Preliminary Report on Patentability for International Application No. PCT/US2006/046108 (Oct. 2, 2008).

Notification of Transmittal of the International Search Report and the Written Opinion of the International Searching Authority, or the Declaration for International Application No. PCT/US07/16370 (Sep. 15, 2008).

Official Action for U.S. Appl. No. 11/879,737 (Sep. 15, 2008).

Notification of Transmittal of the International Search Report and the Written Opinion of the International Searching Authority, or the Declaration for International Application No. PCT/US2006/046108 (Sep. 9, 2008).

Communication of European publication number and information on the application of Article 67(3) EPC for Application No. 06844747.3 (Jul. 23, 2008).

Notification of Transmittal of the International Search Report and the Written Opinion of the International Searching Authority, or the Declaration for International Application No. PCT/US07/24418 (May 1, 2008).

Notice of Allowance and Fee(s) Due for U.S. Appl. No. 11/112,126 (Mar. 28, 2008).

Notice of Allowance and Fee(s) Due for U.S. Appl. No. 11/112,126 (Dec. 17, 2007).

Notice of Allowance for U.S. Appl. No. 10/729,519 (Jul. 30, 2007).

Official Action for U.S. Appl. No. 11/112,126 (Jun. 15, 2007).

"IP Multimedia Subsystem," printout from wikipedia.org, Wikimedia Foundation, Inc. (May 29, 2007).

Official Action for U.S. Appl. No. 10/729,519 (Nov. 28, 2006).

Notification Concerning Transmittal of International Preliminary Report on Patentability for International Application No. PCT/US2004/024328 (Jul. 20, 2006).

"HP OperCall Home Subscriber Server Software—Data Sheet", 4AA0-3360ENW Rev. 2, Hewlett-Packard Development Company, L.P. (Jul. 2006).

Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).

Notice of Allowance for U.S. Appl. No. 10/631,586 (May 25, 2006).

Notification of Transmittal of the International Search Report, or the Declaration and Written Opinion of the International Searching Authority for International Application No. PCT/US2004/024328 (Apr. 25, 2006).

Supplemental Notice of Allowance for U.S. Appl. No. 09/747,070 (Feb. 10, 2006).

Communication pursuant to Rules 109 and 110 EPC for European Application No. 04751843.6 (Dec. 16, 2005).

Notice of Allowance for U.S. Appl. No. 09/747,070 (Dec. 2, 2005).

Interview Summary for U.S. Appl. No. 09/747,070 (Dec. 2, 2005).

Notification Concerning Transmittal of International Preliminary Report on Patentability (Chapter I of the Patent Cooperation Treaty) in International Application No. PCT/US2004/014645 (Nov. 24, 2005).

Advisory Action for U.S. Appl. No. 09/747,070 (Nov. 1, 2005).

Official Action for U.S. Appl. No. 10/631,586 (Oct. 26, 2005).

Notice of Allowance for U.S. Appl. No. 10/166,968 (Sep. 20, 2005).

Schwarz, "ENUM Trial to Link Phone, Internet Addresses," (Mar. 22, 2005).

Supplemental Notice of Allowance and Fee(s) Due for U.S. Appl. No. 10/842,394 (Feb. 9, 2005).

Peterson, "Telephone Number Mapping (ENUM) Service Registration for Presence Services," Network Working Group, RFC 3953 (Jan. 2005).

Jones, "The Definitive Guide to Scaling Out SQL Server," http://www.snip.gob.ni/Xdc/SQL/DGSOSSFinal.pdf (Retrieved on Aug. 16, 2010) (2005).

Notification of Transmittal of the International Search Report and the Written Opinion of the International Searching authority, or the Declaration for International Application No. PCT/US2004/014645 (Dec. 16, 2004).

Notice of Allowance and Fee(s) Due for U.S. Appl. No. 10/842,394 (Dec. 15, 2004).

3GPP, "3$^{rd}$ Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).

Notification of Transmittal of the International Search Reort and the Written 0pinion of the International Searching Authority, or the Declaration for International Application No. PCT/US04/06247 (Nov. 10, 2004).

Notice of Allowance for U.S. Appl. No. 09/471,946 (Oct. 15, 2004).

Final Official Action for U.S. Appl. No. 09/747,070 (May 11, 2005).

Official Action for U.S. Appl. No. 09/747,070 (Jun. 30, 2004).

Peterson et al., "Using E.164 Numbers With the Session Initiation Protocol (SIP)," Network Working Group, RFC 3824, pp. 1-14 (Jun. 2004).

Supplemental Notice of Allowability for U.S. Appl. No. 09/471,946 (May 24, 2004).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Notice of Allowance and Fee(s) Due for U.S. Appl. No. 09/471,946 (Feb. 6, 2004).

Walker, "The IP Revolution in Mobile Messaging," Packet, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 for Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Official Action from European Patent Office in courterpart European Patent Application (Dec. 11, 2003).

Interview Summary for U.S. Appl. No. 09/471,946 (Dec. 9, 2003).

Communication pursuant to Article 96(2) EPC for European Application No. 00988270.5 (Nov. 12, 2003).

Notification of Transmittal of the International Search Report or the Declaration for International Application No. PCT/US2003/018266 (Oct. 31, 2003).

Office Communication for U.S. Appl. No. 09/759,743 (Oct. 20, 2003).

Cisco, "Quality of Service Networks," Internetworking Technologies Handbook, Chapter 49, pp. 49-1—49-32 (Sep. 11, 2003).

Official Action for U.S. Appl. No. 09/471,946 (Jul. 9, 2003).

Moodie, "Agilent acceSS7: White Paper," Agilent Technologies, pp. 1-14 (Apr. 1, 2003).

Notice of Allowance and Fee(s) Due for U.S. Appl. No. 09/759,743 (Mar. 10, 2003).

Interview Summary for U.S. Appl. No. 09/759,743 (Feb. 27, 2003).

Foster et al., "Number Portability in the Global Switched Telephone Network (GSTN): An Overview," Network Working Group, RFC 3482 (Feb. 2003).

"Cisco IP Transfer Point," Cisco Systems, Inc., pp. 1-10 (Copyright 1992-2003).

"Cisco IP Transfer Point Multilayer Short Message Serivce Routing Solution," Cisco Systems, Inc., pp. 1-6 (Copyright 1992-2003).

"Cisco ITP Map Gateway for Public WLAN Slm Authentication and Authorization," Cisco Systems, Inc., pp. 1-13 (Copyright 1992-2003).

Final Official Action for U.S. Appl. No. 09/759,743 (Dec. 2, 2002).

Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Global Implementation of ENUM: A Tutorial Paper," International Telecommunication Union, Telecommunication Standardization Union, Study Group 2, (Feb. 8, 2002).
"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
Imternational Preliminary Examination Report for the International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach-SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signaling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability, " AT&T Network Systems, No. 1, p.1-75, (Feb. 2, 1996).
ETSI, Digital Cellular Telecommunications Systems (Phase 2+); Milbe Application Part (MAP) Specification, Global System for Moblie Communications, pp. 112-114 (1996).

Jain, ET AL., "A Hashing Scheme for Phone Number Portability in PCS Systems with ATM Backbones," Bell Communications Research, p. 593-597, (1996).
Bishop, "Freeing the Network for Competition, " Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano ET AL., "PCS Number Portability," IEEE, p. 1146-1150, (Sep. 1994).
Bellcore, "Signaling Transfer Point (STP) Generic Requirements, " Bell Communications Research, No. 1, p. ii-xxii, 4-84-J14, (Jun. 1994).
Telcordia Technologies, "CCS Network Interface Specifications (CCSNIS) Supporting SCCP and TCAP," Bell Communications Research, p. ii-xii, 1-1—C-22, (Mar. 1994).
Buckles, "Very High Capacity Signaling Trnsfer Point for Intelligent Network Services," DSC Communications Corporation, p. 1308-1311, (1998).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1—1-8 (Publication Date Unknown).
"Configuring ITP Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Neustar, "ENUM: Driving Convergence in the Internet Age," pp. 1-5 (Publication Date Unknown).
Applicant-Initiated Interview Summary for U.S. Appl. No. 12/906,816 (Jan. 27, 2012).
Notice of Allowance and Fee(s) Due for U.S. Appl. No. 11/605,837 (Jan. 20, 2012).
Decision to Grant a European Patent Pursuant to Article 97(1) EPC for European Patent Application No. 06844747.3 (Jan. 19, 2012).
Communication Pursuant to Article 94(3) EPC for Eurpoean Patent Application No. 04751843.6 (Dec. 15, 2011).
Interview Summary for U.S. Appl. No. 11/982,549 (Nov. 28, 2011).
Second Office Action for Chinese Patent Application No. 200680051295.9 (Oct. 9, 2011).
Non-Final Official Action for U.S. Appl. No. 12/906,816 (Oct. 5, 2011).
Non-Final Official Action for U.S. Appl. No. 12/906,998 (Sep. 21, 2011).
Final Official Action for U.S. Appl. No. 11/982,549 (Aug. 31, 2011).
Non-Final Official Action for U.S. Appl. No. 12/400,576 (Aug. 24, 2011).
Communication under Rule 71(3) EPC for European Application No. 06 844 747.3 (Jul. 19, 2011).
Notification of Transmittal of the International Search Report and the Written Opinion of the International Searching Authority, or the Declaration for International Application No. PCT/US2010/053062 (Jun. 28, 2011).
Notice of Publication of Abstract for Indian Patent Application No. 6406/CHENP/2010 A (Jun. 17, 2011).
First Office Action for Chinese Patent Application No. 200780034804.1 (May 19, 2011).
Notice of Allowance and Fee(s) Due for U.S. Appl. No. 11/888,907 (Apr. 1, 2011).
Tsou et al., "Realm-Based Redirection in Diameter," draft-ietf-dime-realm-based-redirect-03, RFC 3588, pp. 1-6 (Jul. 12, 2010).
"3rd Generation Partnership Project; Technical Specification Group Core Netwrok and Terminals; Policy and Charging Control signalling flows and Quality of Service (QoS) parameter mapping (Release 9)," 3GPP TS 29.213, V9.2.0, pp. 1-129 (Mar. 2010).

Korhonen et al., "Clarifications on the Routing of Diameter Requests Based on the Username and the Realm," RFC 5729, pp. 1-9 (Dec. 2009).
"3rd Generation Partnership Project; Technical Specification Group Core Network and Terminals; Evovled Packet Systems (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).
Jones et al., "Diameter Command Code Registration for the Third Generation Partnership Project (3GPP) Evolved Packet System (EPS)," Network Working Group, RFC 5516, pp. 1-5 (Apr. 2009).
Communication of European publication number and information on the application of Article 67(3) EPC for European Application No. 07810606.9 (Mar. 18, 2009).
Communication of European publication number and information on the application of Article 67(3) EPC for European Application No. 07809476.0 (Feb. 11, 2009).
"3rd Generation Partnership Project; Technical Specification Group Services and System Aspects; Policy and charging control architecture (Release 8)," 3GPP TS 23.203, V8.1.1, pp. 1-87 (Mar. 2008).
Tschofenig et al., "Securing the Next Steps in Signaling (NSIS) Protocol Suite," International Journal of Internet Protocol Technology, vol. 1, pp. 1-14 (2006).
Notification of European publication number and information on the application of Article 67(3) EPC for European Application No. 04751843.6 (Dec. 29, 2005).
Stiemerling et al., "NAT/Firewall NSIS Signaling Layer Protocol (NSLP)," draft-ietf-nsis-nsip-natfw-06, pp. 1-70 (May 16, 2005).
Notification of European Publication Number and Information on the Application of Article 67(3) EPC for European Application No. 03734522.0 (Mar. 23, 2005).
Calhoun et al., "Diameter Base Protocol," RFC 3588, pp. 1-90 (Sep. 2003).
Advisory Action for U.S. Appl. No. 12/400,576 (Jun. 26, 2012).
Advisory Action for U.S. Appl. No. 12/906,816 (Jun. 5, 2012).
Applicant-Initiated Interview Summary for U.S. Appl. No. 12/906,816 (May 17, 2012).
Notice of Allowance and Fee(s) Due for U.S. Appl. No. 11/635,406 (Apr. 20, 2012).
Final Official Action for U.S. Appl. No. 12/906,998 (Mar. 29, 2012).
Third Office Action for Chinese Patent Application No. 200680051295.9 (Mar. 20, 2012).
Final Official Action for U.S. Appl. No. 12/400,576 (Mar. 9, 2012).
Final Official Action for U.S. Appl. No. 12/906,816 (Feb. 21, 2012).
Notice of Granting Patent Right for Invention for Chinese Patent Application No. 200680051295.9 (Nov. 6, 2012).
Notification of Transmittal of the International Search Report and the Written Opinion of the International Searching Authority, or the Declaration for International Application No. PCT/US2012/029673 (Oct. 31, 2012).
Decision of Rejection for Chinese Patent Application No. 200780034804.1 (Aug. 31, 2012).
First Office Action for Chinese Patent Application No. 200880110878.3 (Aug. 27, 2012).
Communication of European publication number and information on the application of Article 67(3) EPC for European Application No. 10824243.9 (Jul. 25, 2012).
First Official Action for Chinese Patent Application No. 200880103119.4 (Jul. 4, 2012).
"3rd Generation Partnership Project; Technical Specification Group Services and System Aspects; Telecommunication management; Charging managmant; Diameter charging applications (Release 11)," 3GPP TS 32.299, V11.3.0, pp. 1-150 (Mar. 2012).
"3rd Genration Partnership Project; Technical Specification Group Core Network and Terminals; IP multimedia call control protocol based on Session Initiation Protocol (SIP)and Session Description Prottocol (SDP); Stage 3 (Release 11)," 3GPP TS 24.229, V11.3.0, pp. 1-728 (Mar. 2012).
Second Office Action for Chinese Patent Application No. 200780034804.1 (Feb. 21, 2012).
"3rd Generation Partnership Project; Technical Specification Group Core Network and Terminals; Sh Interface based on the Diameter protocol; Protocol details (Release 11)," 3GPP TS 29.329, V11.1.0, pp. 1-22 (Dec. 2011).

"3rd Generation Partnership Project; Technical Specifications Group Core Network and Terminals; IP Multimedia (IM) Subsystem Sh interface; Signalling flows and message contents (Release 11)," 3GPP TS 29.328, V11.2.0, pp. 1-53 (Dec. 2011).
"3rd Generation Partnership Project; Technical Specification Group Core Network and Terminals; Evolved Packet Systems (EPS); Mobility Managment Entity (MME) and Serving GPRS Support Node (SGSN) related interfaces based on Diameter protocol (Release 11)," 3GPP TS 29.272, V11.1.0, pp. 1-98 (Dec. 2011).
"3rd Generation Partnership Project; Technical Specification Group Core Network and Terminals; Cx and Dx interfaces based on the Diameter protocol; Protocol details (Release 11)," 3GPP TS 29.229, V11.2.0, pp. 1-37 (Dec. 2011).
"3rd Generation Partnership Project; Technical Specification Group Core Network and Terminals; IP Multimedia (IM) Subsystem Cx and Dx interfaces; Signalling flows and message contents (Release 11)," 3GPP TS 29.228, V11.2.0, pp. 1-71 (Dec. 2011).
"3rd Generation Partnership Project; Technical Specification Group Core Network and Terminals; Policy and Charging Control over Rx reference point (Release 11)," 3GPP TS 29.214, V11.3.0, pp. 1-51 (Dec. 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011.).
"3rd Generation Partnership Project; Technical Specification Group Core Network and Terminals; Mobile Application Part (MAP) specification (Release 11)," 3GPP TS 29.002, V11.1.0, pp. 1-954 (Dec. 2011).
"3rd Generation Partnership Project; Technical Specification Group Core Network and Terminals; Organization of subscriber data (Release 11)," 3GPP TS 23.008, V11.2.0, pp. 1-105 (Dec. 2011).
"3rd Generation Partnership Project; Technical Specification Group Core Network and Terminals; Numbering, addressing and identification (Release 11)," 3GPP TS 23.003, V11.0.0, pp. 1-81 (Dec. 2011).
"3rd Generation Partnership Project; Technical Specification Group Services and System Aspects; Network architecture (Release 11)," 3GPP TS 23.002, V11.1.0, pp. 1-96 (Dec. 2011).
"3rd Generation Partnership Project; Technical Specification Group Services and System Aspects; Telecommunication management; Charging management; Charging Data Record (CDR) transfer (Release 10)," 3GPP TS 32.295, V10.0.0 pp. 1-32 (Mar. 2011).
"3rd Generation Partnership Project; Technical Specification Group Core Network and Terminals; Generic Authentication Architecture (GAA); Zh and Zn Interfaces based on the Diameter protocol; Stage 3 (Release 10)," 3GPP TS 29.109, V10.0.0 pp. 1-67 (Mar. 2011).
"The international public telecommunication numbering plan," ITU-T, E.164, pp. 1-32 (Nov. 2010).
"The international identification plan for public networks and subscriptions," ITU-T, E.212, pp. 1-28 (May 2008).
"3rd Generation Partnership Project; Technical Specification Group Core Network and Terminals; Charging rule provisioning over Gx interface (Release 6)," 3GPP TS 29.210, V6.7.0, pp. 1-21 (Dec. 2006).
"3rd Generation Partnership Project; Technical Specification Group Service and System Aspects; Telecommunication management; Charging management; Charging data description for the IP Multimedia Subsystem (IMS) (Release 5)," 3GPP TS 32.225, V5,11.0, pp. 1-63 (Mar. 2006).
Aboba et al., "The Network Access Identifier," RFC 4282, pp. 1-17 (Dec. 2005).
Hakala et al., "Diameter Credit-Control Application," RFC 4006, pp. 1-115 (Aug. 2005).
Calhoun et al., "Diameter Network Access Server Application," RFC 4005, pp. 1-86 (Aug. 2005).
Schulzrinne, "The tel URI for Telephone Numbers," RFC 3966, pp. 1-18 (Dec. 2004).
Rosenberg et al., "SIP: Session Initiation Protocol," RFC 3261, pp. 1-270 (Jun. 2002).
Berners-Lee et al., "Uniform Resource Identifiers (URI): Generic Syntax," RFC 2396, pp. 1-41 (Aug. 1998).

* cited by examiner

METHODS, SYSTEMS, AND COMPUTER READABLE MEDIA FOR PROVIDING SCALABLE NUMBER PORTABILITY (NP) HOME LOCATION REGISTER (HLR)

PRIORITY CLAIM

This application claims the benefit of U.S. Provisional Patent Application Ser. No. 61/177,096, filed May 11, 2009; the disclosure of which is incorporated herein by reference in its entirety.

TECHNICAL FIELD

The subject matter described herein relates to providing number portability and home location register functionality in a mobile communications network. More particularly, the subject matter described herein relates to methods, systems, and computer readable media for providing a scalable NP-HLR.

BACKGROUND

An NP-HLR is a function defined for GSM and IS-41 mobile communications networks that stores subscription and location information for ported-in subscribers and that functions as a virtual VLR for ported-out subscribers. For example, for a call to a ported-in subscriber, an NP-HLR responds to a request for routing information with the MSC/VLR ID of the MSC/VLR where the subscriber is currently registered. For a call to a ported-out subscriber, the NP-HLR responds to a provide roaming number message from the donor HLR with the routing number of the network to which the subscriber's subscription has been ported. For a call to a non-ported foreign subscriber, the NP-HLR responds to a request for routing information with the routing number of the network where the subscriber's subscription is located.

Problems associated with providing NP-HLR functionality include provisioning and scalability. For example, there is currently no known standardized way to provision the VLR function of an NP-HLR with the routing numbers for ported-out subscribers. As the number of ported-out subscribers increases, the provisioning problem is magnified.

With regard to scalability, the NP-HLR is currently defined monolithically (i.e., as a single node) that provides the NP and HLR functionality. As a result, as the number of ported subscribers increases to exceed the capacity of a single NP-HLR, both the NP and HLR functions must be replicated, resulting in increased expense over replicating only the HLR functionality.

Accordingly, in light of these difficulties, there exists a need for improved methods, systems, and computer readable media for providing a scalable NP-HLR.

SUMMARY

The subject matter described herein includes methods, systems, and computer readable media for providing a scalable NP-HLR. According to one aspect, the subject matter described herein includes a system for providing an NP-HLR is provided. The system includes an NP front end node for receiving requests for routing information for ported-in and non-ported foreign mobile subscribers, for making portability determinations in response to the requests, for processing or routing the requests based on the portability determinations, and for receiving and responding to provide roaming number requests for ported-out mobile subscribers. The system further includes at least one HLR back end node for performing HLR functions for ported-in foreign mobile subscribers including receiving, from the NP front end node, the requests for routing information for the ported-in foreign mobile subscribers and for responding to the requests with the routing information for the ported-in foreign mobile subscribers.

As used herein, the term, "foreign mobile subscriber" refers to a subscriber whose directory number is outside the range or block of directory numbers assigned to a service provider. The subject matter described herein for providing a scalable NP-HLR may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

The term "node" as used herein refers to a physical computing platform for performing the described functions. For example, an NP front end node is a computing platform that performs the NP-HLR front end functions described herein, and an HLR back end node as a computing platform that performs the HLR back end functions described herein.

BRIEF DESCRIPTION OF THE DRAWINGS

Preferred embodiments of the subject matter described herein will now be explained with reference to the accompanying drawings of which.

DETAILED DESCRIPTION

Figure 1:
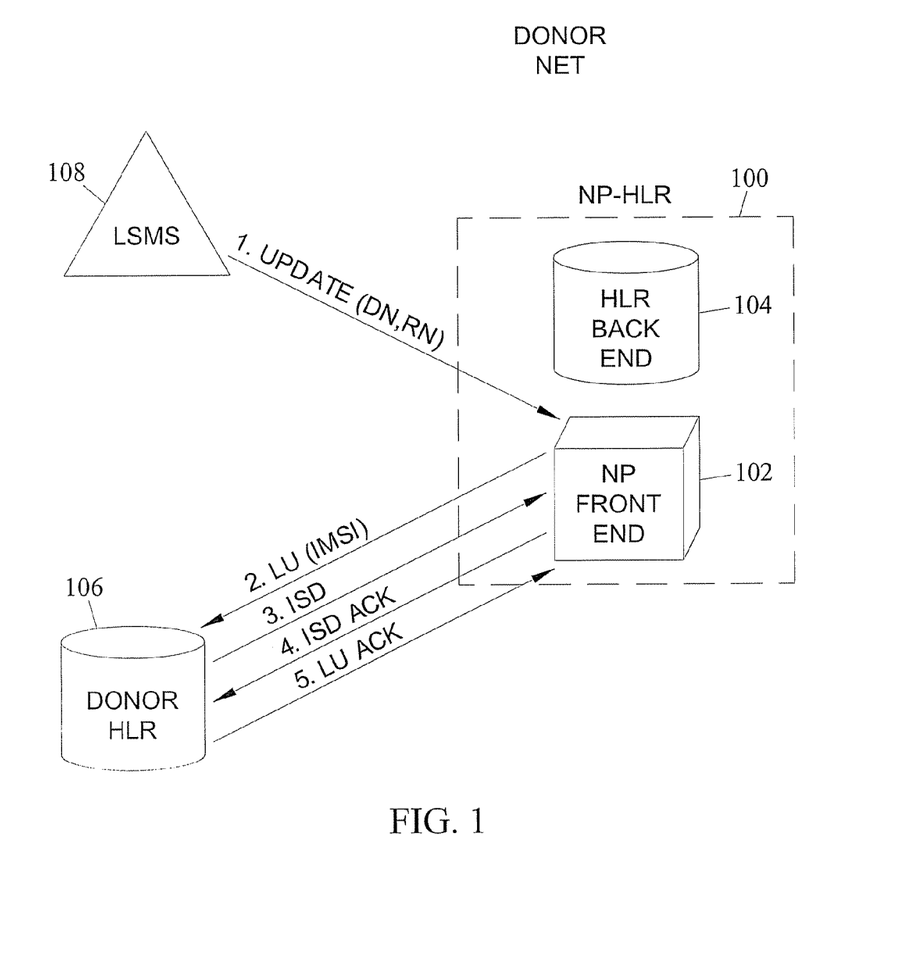
FIG. 1 is a network diagram illustrating a scalable NP-HLR and a method for automatically provisioning the NP-HLR as subscribers are ported out of the network of the NP-HLR according to an embodiment of the subject matter described herein.

The subject matter described herein includes methods, systems, and computer readable media for providing a scalable NP-HLR. FIG. 1 is a network diagram illustrating a scalable NP-HLR and a method for automatically provisioning the NP-HLR for ported-out subscribers according to an embodiment of the subject matter described herein. Referring to FIG. 1, an NP-HLR 100 includes an NP front end node 102 that receiving requests for routing information for ported-in and non-ported foreign mobile subscribers. NP front end node 102 makes number portability determinations in response to the requests and processes or routes the requests based on the portability determinations. NP front end node 102 also receives and responds to provide roaming number requests for ported-out mobile subscribers. NP-HLR 100 includes at least one HLR back end node 104 that performs HLR functions for ported-in foreign mobile subscribers. The HLR functions include receiving, from the NP front end node, the requests for routing information for the ported-in foreign mobile subscribers and for responding to the requests with the routing information for the ported-in foreign mobile subscribers.

In the example illustrated in FIG. 1, NP-HLR 100 triggers automatic provisioning of a donor HLR 106 and NP front end node 102 in a donor network to properly handle signaling for calls for ported-out subscribers. As used herein, the term "donor network" refers to a network from which a subscriber is ported. When a subscriber is ported out of the network of NP-HLR 100, a local service management system (LSMS) 108 or other number portability provisioning system sends an update message to NP front end 102 with the directory number (DN) of the ported-out subscriber and the routing number (RN) corresponding to the network to which the subscriber is being ported. In response to the update message. NP front end 102 generates a location update (LU) message and sends the LU message to donor HLR 106. In the LU message, NP front end 102 inserts its entity identifier as the serving MSC/VLR. This triggers donor HLR 106 to send an insert subscriber data (ISD) message to NP front end 102 as if NP front end 102 were the serving MSC/VLR. NP front end 102 stores a mapping between the ported-out subscriber DN and both the RN of the network to which the subscriber has been ported and the IMSI. NP front end node 102 includes the IMSI in the LU to donor HLR 106. NP front end node 102 also uses IMSI to identify to which HLR to send the LU, as the IMSI will be a global title address in the LU. NP front end 102 responds to the ISD message with an ISD acknowledgement message, and donor HLR 106 responds to the LU message with an LU acknowledgement message. By triggering the location provisioning of the ported-out subscriber information into NP HLR 100 using the existing GSM location update functionality, automatic provisioning of NP-HLR 100 for ported-out subscribers is achieved.

Figure 2:
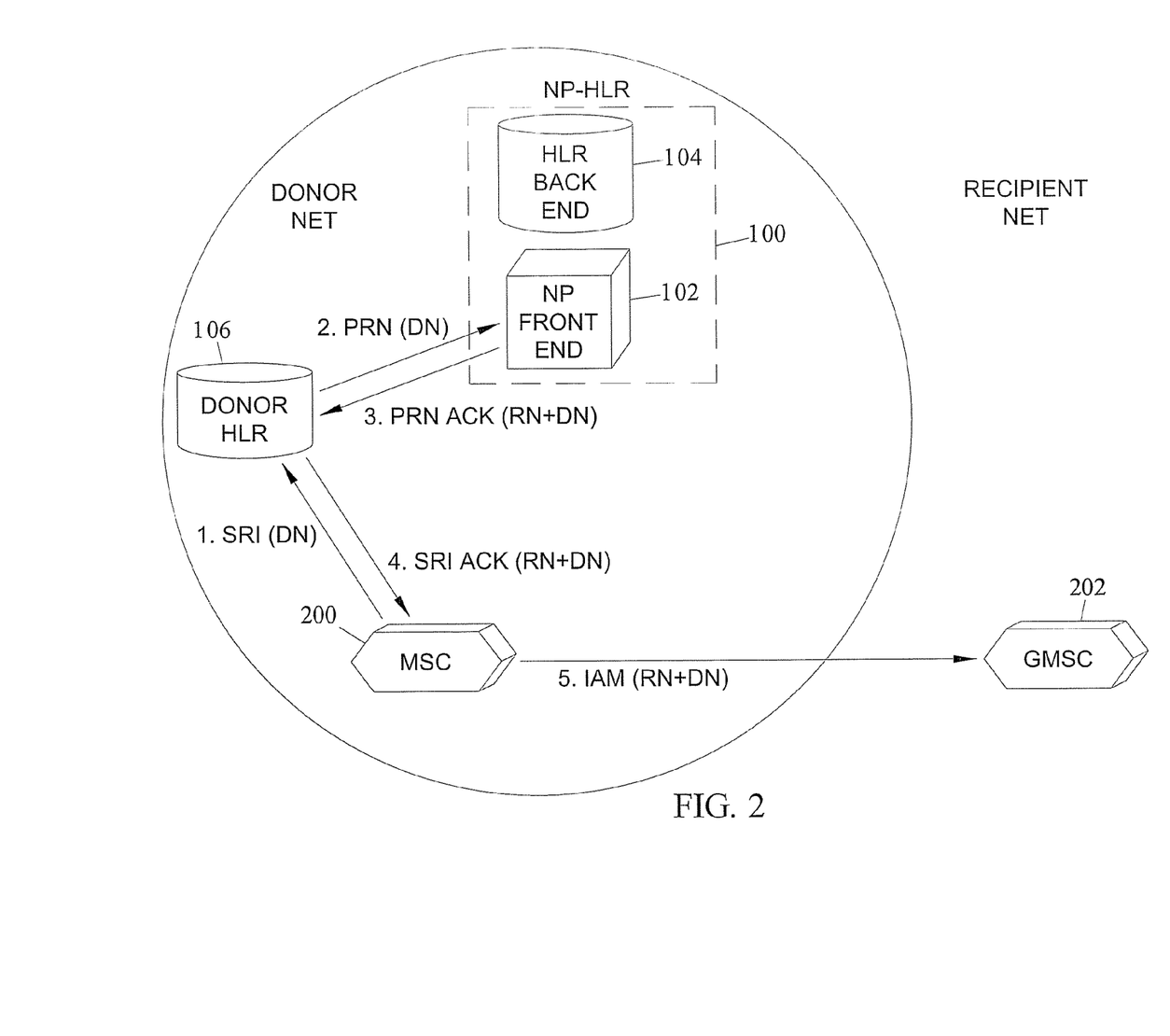
FIG. 2 is a network diagram illustrating processing performed by an NP-HLR in response to a call to a ported-out subscriber according to an embodiment of the subject matter described herein.

After the automatic provisioning illustrated in FIG. 1, donor HLR 106 believes that the NP-HLR 100 is the MSC/VLR where the subscriber for the DN of FIG. 1 is registered. As a result, donor HLR 106 will send provide roaming number (PRN) messages to NP-HLR 100 in response to send routing information (SRI) messages inquiring about the subscriber DN. FIG. 2 is a network diagram illustrating processing performed by NP-HLR 100 in response to a call to a ported-out subscriber according to an embodiment of the subject matter described herein. Referring to FIG. 2, when a call arrives at MSC 200, MSC 200 generates an SRI message containing the directory number (DN) of the destination of the call and sends the SRI to donor HLR 106. Donor HLR 106, in response to the SRI, sends a provide roaming number (PRN) message to NP front end 102 requesting the routing number of the network where the subscriber is registered. NP front end 102 responds to the PRN message with the routing number (RN) of the network to which the subscriber has been ported. Donor HLR 106, in response to receiving the PRN ack message with the RN of the network to which the subscriber has been ported, sends an SRI ack message to MSC 200 with the RN. MSC 200 then routes the call to the new network of the subscriber by sending an ISUP initial address message (IAM) to gateway mobile switching center 202 in the network to which the subscriber has been ported. Thus, for the ported-out case, NP front end 102 responds to PRN messages like a conventional VLR, allowing HLR back end node 104 to be implemented using a standard or conventional HLR.

Figure 3:
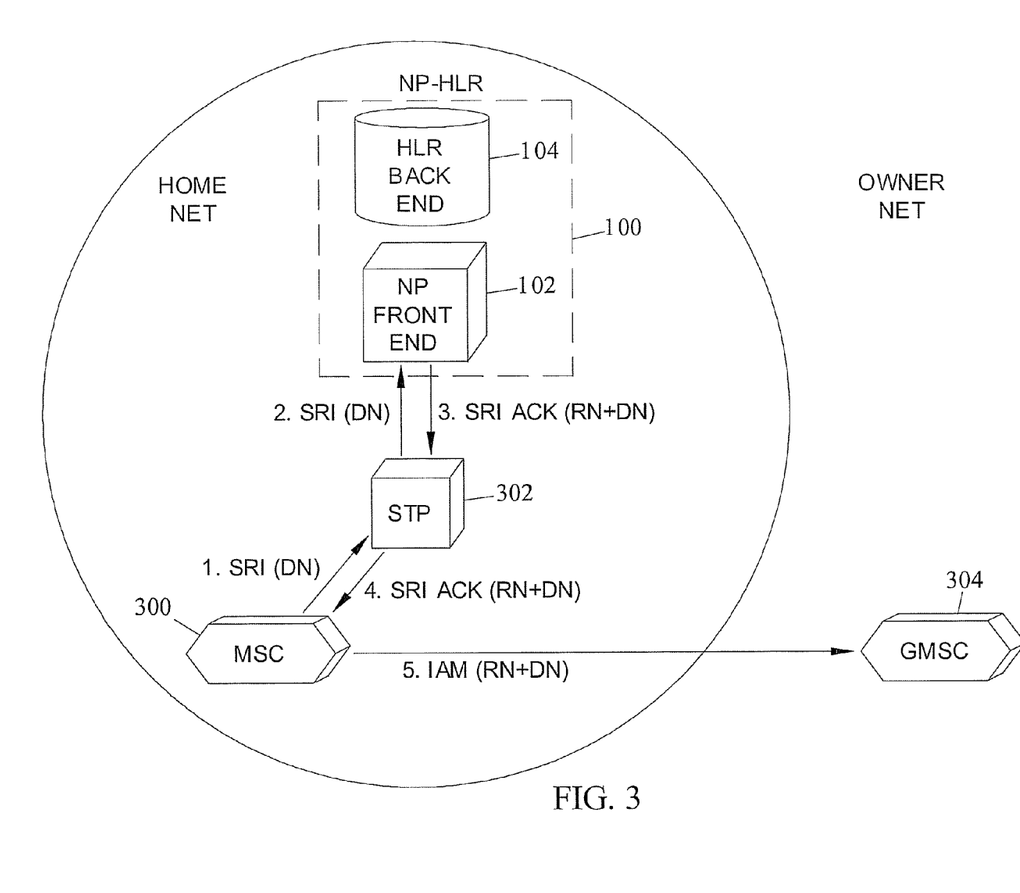
FIG. 3 is a network diagram illustrating exemplary processing performed by an NP-HLR for a call directed to a non-ported foreign subscriber according to an embodiment of the subject matter described herein.

FIG. 3 is a network diagram illustrating exemplary processing performed by NP-HLR 100 for a call directed to a non-ported foreign subscriber according to an embodiment of the subject matter described herein. In FIG. 3, home network MSC 300 receives a call directed to a non-ported, foreign DN. In this example, it is assumed that MSC 300 is configured to request routing information for all calls directed to foreign DNs from NP-HLR 100. Alternatively, MSC 300 may be configured to send all SRI messages to STP 302, and STP 302 may be configured to route all SRI messages with foreign DNs to NP-HLR 100. Accordingly, MSC 300 sends an SRI message requesting routing information for the foreign DN to STP 302. STP 302 routes the SRI message to NP-HLR 100. NP front end node 102 of NP-HLR 100 receives the SRI message and determines that the DN corresponds to a non-ported, foreign subscriber. In one example, NP front end node 102 may determine that the subscriber is non-ported and foreign by searching for an entry for the DN in its number portability database. An entry for the DN would not be present because the subscriber is not ported and therefore would not have been provisioned in the number portability database. In this case. NP front end node 102 utilize a service provider database that is separate from or part of the number portability database that indicates ranges of DNs that correspond to different service providers and the corresponding RNs. NP front end 102 responds to the SRI message with the RN corresponding to the network of the non-ported foreign subscriber. MSC 300 receives the RN and routes the call to the network of the foreign subscriber by sending an IAM message to GMSC 304 corresponding to the network of the foreign subscriber.

Figure 4:
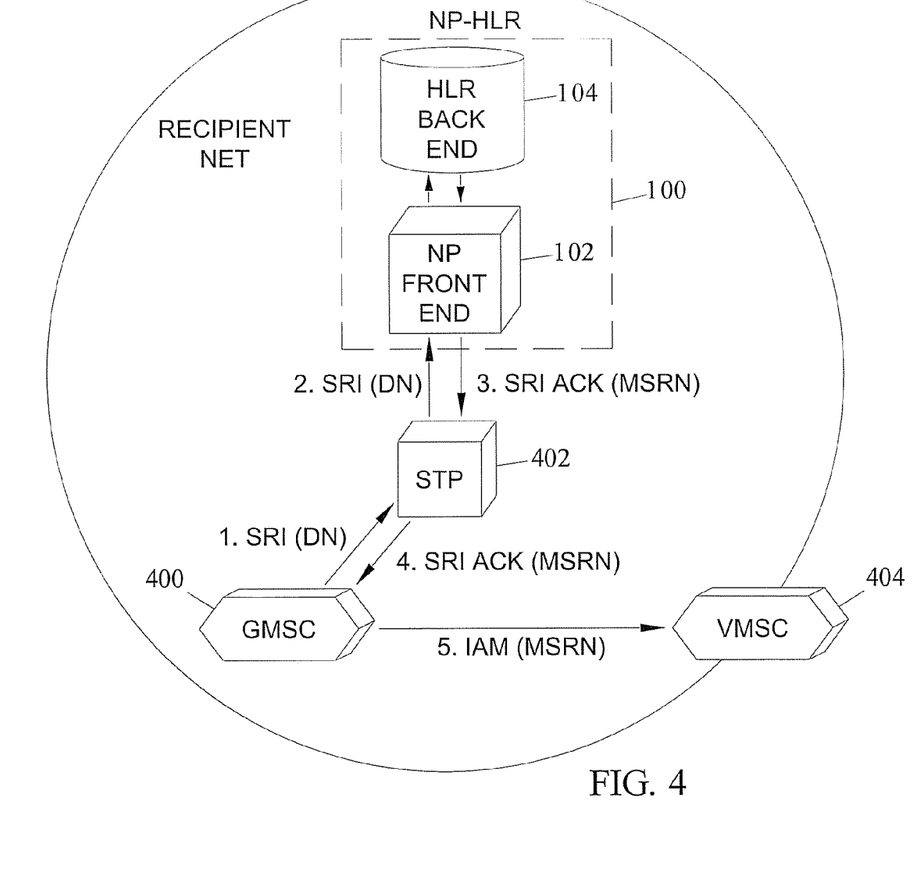
FIG. 4 is a network diagram illustrating exemplary processing that may be performed by an NP-HLR for a call to a ported-in subscriber according to an embodiment of the subject matter described herein.

FIG. 4 is a network diagram illustrating exemplary processing that may be performed by NP-HLR 100 for a call to a ported-in subscriber according to an embodiment of the subject matter described herein. HLR back end node 104 may be provisioned with subscription information for ported-in subscribers through any suitable provisioning interface, such as a business and operation support system (BOSS). NP front end node 102 may be provisioned through a similar interface with NP data for ported-in subscribers. Such data may include the foreign DN, which is stored in the number portability database of NP front end node 102. In FIG. 4, GMSC 400 receives a call to a ported-in subscriber. Since a ported-in subscriber would have a foreign DN. GMSC 400 sends an SRI to NP-HLR 100 via STP 402. NP front end node 102 receives the SRI, performs a number portability lookup for the DN extracted from the SRI, and identifies the subscriber as ported in. In response to identifying the subscriber as ported in, NP front end node 102 forwards the SRI to HLR back end node 104. HLR back end node 104 performs a lookup based on the DN, locates the ported-in subscriber's record, and responds to the SRI with an SRI ack containing subscription and location information for the subscriber. In this example, it is assumed that the subscriber is currently registered with visited mobile switching center (VMSC) 404. Accordingly, GMSC 400 routes the call to VMSC 404 by sending an ISUP IAM to VMSC 404. Thus, by functioning as an NP front end for HLR back end 104, NP front end node 102 eliminates the need for modifications to an HLR and its database to contain number portability information.

Figure 5:
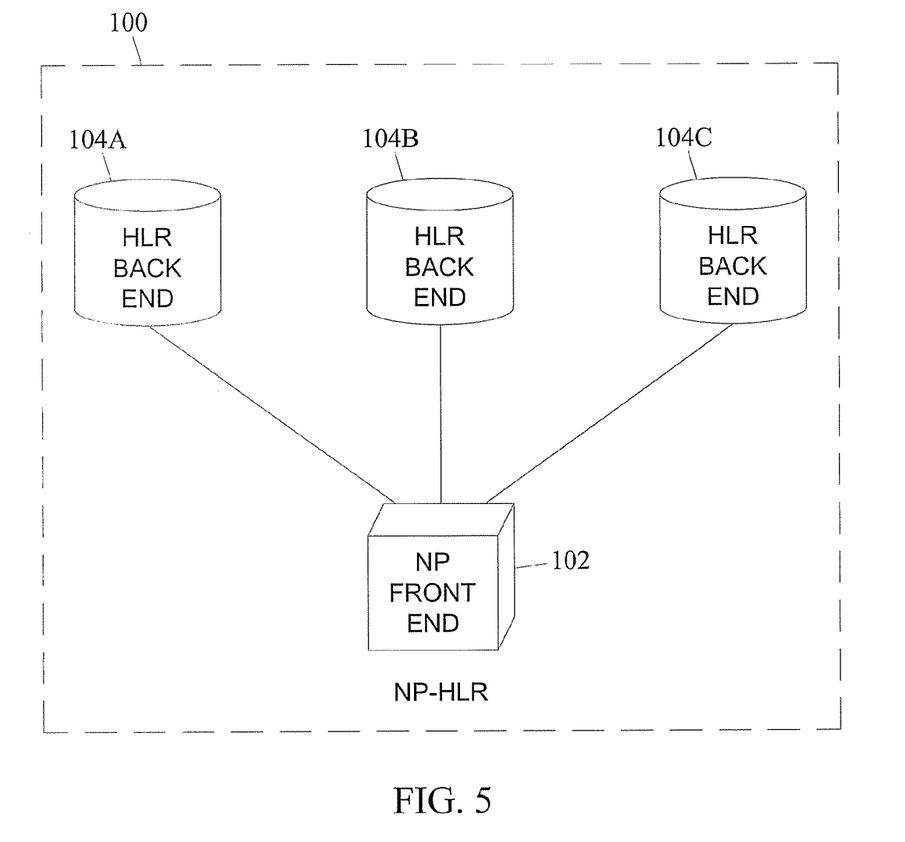
FIG. 5 is a block diagram illustrating an NP-HLR where a single NP front end node serves plural HLR back end nodes according to an embodiment of the subject matter described herein.

As stated above, separating the NP front end and HLR back end functions makes NP-HLR 100 more scalable than monolithic implementations. For example, N NP front end nodes 102 may serve M HLR back end nodes, 104, where N is less than M. FIG. 5 illustrates an example of this configuration. In FIG. 5, NP-HLR 100 includes a single NP front end node 102 that serves plural HLR back end nodes 104A-104C. In such a scenario, NP front end node 102 may, in addition to storing number portability information, store mappings between DNs and HLR back end nodes, either based on individual subscriber numbers and/or ranges of subscriber numbers. The message flows for the example illustrated in FIG. 5 would be the same as those illustrated in FIGS. 1-4, except that NP front end node 102, for each message that is destined for an NP-HLR function, may perform a lookup in an HLR association database to determine the HLR that contains the subscriber record. Thus, separating the NP front end and HLR back end functions, NP-HLR 100 can be scaled through the addition of HLR back end nodes without requiring the addition of NP front end nodes (provided that the capacity of the NP database is not exceeded), resulting in decreased scaling costs over monolithic NP-HLRs. A single front end solution also retains all of the benefits of the NP-HLR solution as a whole.

As indicated above, NP front end node 102 and HLR back end node 104 may be implemented on separate computing platforms. In one example, NP front end node 102 may be implemented on an signal transfer point (STP) and/or signaling relay function (SRF) platform, and HLR back end node 104 may be implemented on a conventional HLR platform. An exemplary STP/SRF platform suitable for implementing NP front end 102 is the Eagle® STP/SRF platform configured with the G-PORT feature, available from Tekelec of Morrisville, N.C. An exemplary HLR platform suitable for implementing HLR back end 104 is any HLR available from Ericsson, Inc.

Figure 6:
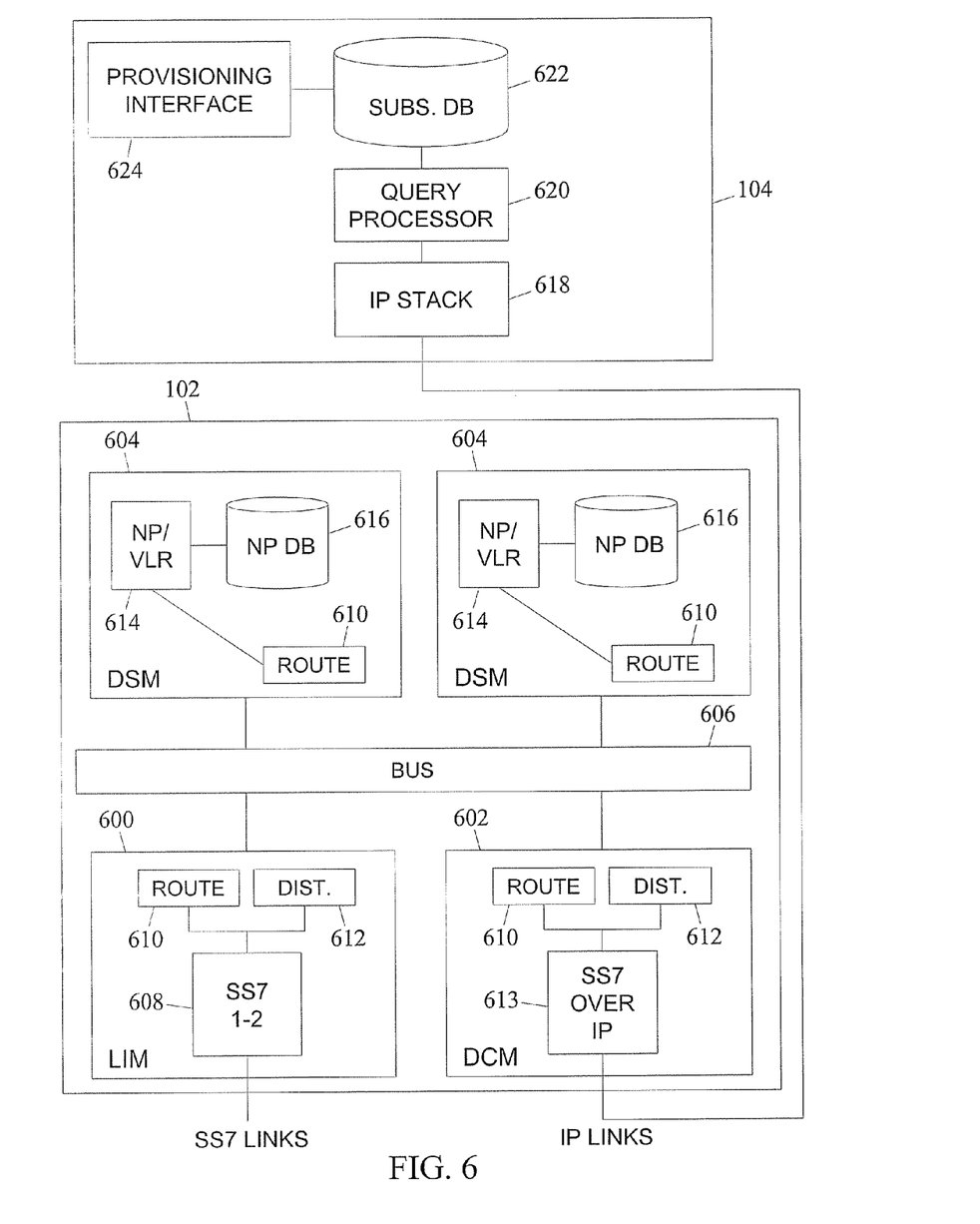
FIG. 6 is a block diagram illustrating an exemplary internal architecture of an NP-HLR according to an embodiment of the subject matter described herein.

FIG. 6 is a block diagram illustrating an exemplary internal architecture of NP-HLR 100 according to an embodiment of the subject matter described herein. In FIG. 6, NP front end node 102 is implemented on an STP platform including communication link modules 600 and 602 for respectively interfacing with SS7 and IP signaling links and database services modules (DSMs) 604 for performing number portability lookups and related query message processing. Each module 600, 602, and 604 may be a printed circuit board with one or more processors and memory that stores databases and software for implementing the respective module's functions. Modules 600, 602, and 604 may communicate with each other over a bus 606 or internal LAN. Module 600 may be an SS7 link interface module (LIM) with hardware and software for implementing an SS7 protocol levels 1 and 2 608, a routing function 610 for implementing SS7 MTP level 3 routing and a distribution function 612 for distributing messages that require internal processing to one of DSMs 604. Similarly, data communications module (DCM) or IP LIM 602 includes hardware and software for implementing SS7 over IP transport 613 and routing and distribution functions 610 and 612 for respectively implementing SS7 MTP level 3 routing and message distribution.

DSMs 604 may be identically provisioned to include an NP/VLR module 614 for making portability determinations, responding to SRI and PRN messages, and routing PRN messages, as illustrated above with regard to FIGS. 1-5. Each DSM 604 may also include an NP database 616 that contains (DN-specific) entries for ported-in subscribers, DN-specific entries for ported-out subscribers, and range-based entries for non-ported foreign subscribers.

HLR back end node 104 may include an IP stack 618 for communicating with NP front end node 102 using Internet protocol, a query processor 620 for processing SRI messages and formulating SRI acknowledgement messages, and a subscriber database 622 for storing subscription and location information for ported-in subscribers. HLR back end node 104 may include a provisioning interface 624 for manual or automatic provisioning of information in subscriber database 622. HLR back end node 104 may also include the capability to process location update and other types of messages processed by HLRs in accordance with GSM or other HLR specifications. However, HLR back end node 104 is not required to have non-standard HLR functionality, such as number portability processing functionality, thus increasing the scalability of NP-HLR 100 over monolithic NP-HLR implementations.

Although the examples above relate primarily to providing NP-HLR functionality for signaling relating to voice calls, the subject matter described herein can also provide the NP-HLR functionality for other types of communication, such as SMS and MMS communication. For example, NP-HLR may process SRI for SM messages in the same manner described above for SRI messages. Thus, the term "request for routing information," as described herein can refer to such a request in response to a voice call or a messaging communication.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing a number portability (NP) home location register (HLR), the system comprising:
    an NP front end node for receiving requests for routing information for ported-in and non-ported foreign mobile subscribers, for making portability determinations in response to the requests, for processing or routing the requests based on the portability determinations, and for receiving and responding to provide roaming number requests for ported-out mobile subscribers, wherein the NP front end node receives the provide roaming number requests for the ported-out mobile subscribers from donor HLRs and responds to the donor HLRs with routing numbers corresponding to networks to which the ported-out mobile subscribers have been ported; and
    at least one HLR back end node for performing HLR functions for ported-in foreign mobile subscribers including receiving, from the NP front end node, the requests for routing information for the ported-in foreign mobile subscribers and for responding to the requests with the routing information for the ported-in foreign mobile subscribers.

2. The system of claim 1 wherein the NP front end node processes the requests for routing information for the non-ported foreign mobile subscribers by providing routing numbers corresponding to the networks of the non-ported foreign mobile subscribers.

3. The system of claim 1 wherein the NP front end node routes the requests for routing information for the ported-in foreign mobile subscribers to the at least one HLR back end node.

4. The system of claim 1 wherein the NP front end node comprises a single NP front end node and the at least one HLR back end node comprises a plurality of HLR back end nodes and wherein the NP front-end node, in response to a received request for routing information for a ported-in foreign mobile subscriber, identifies which of the HLR back end nodes contains the subscription information for the ported-in foreign mobile subscriber and forwards the received request for routing information to the identified HLR back end node.

5. A system for providing a number portability (NP) home location register (HLR), the system comprising:
an NP front end node for receiving requests for routing information for ported-in and non-ported foreign mobile subscribers, for making portability determinations in response to the requests, for processing or routing the requests based on the portability determinations, and for receiving and responding to provide roaming number requests for ported-out mobile subscribers; and
at least one HLR back end node for performing HLR functions for ported-in foreign mobile subscribers including receiving, from the NP front end node, the requests for routing information for the ported-in foreign mobile subscribers and for responding to the requests with the routing information for the ported-in foreign mobile subscribers, wherein the NP front end node receives update messages from a number portability provisioning system as subscribers are ported out of a service provider's network and, in response to the update messages, looks up a donor IMSI in its internal database or receives the donor IMSI in the provisioning update, sends location update messages to donor HLRs to trigger the donor HLRs to point to the NP front end node as the MSC/VLR where the ported out subscribers are currently registered.

6. The system of claim 5 wherein the NP front end node inserts its entity identifier as the VLR ID in the location update messages.

7. The system of claim 1 wherein the NP front end node is implemented on a signal transfer point (STP) platform configured with a mobile number portability database.

8. The system of claim 1 wherein the at least one HLR back end node comprises an HLR without NP determination capabilities.

9. A method for providing a number portability (NP) home location register (HLR), the method comprising:
at an NP front end node, receiving requests for routing information for ported-in and non-ported foreign mobile subscribers, making portability determinations in response to the requests, processing or routing the requests based on the portability determinations, and receiving and responding to provide roaming number requests for ported-out mobile subscribers, wherein the NP front end node receives the provide roaming number requests for the ported-out mobile subscribers from donor HLRs and responds to the donor HLRs with routing numbers corresponding to networks to which the ported-out mobile subscribers have been ported; and
at at least one HLR back end node, performing HLR functions for ported-in foreign mobile subscribers including receiving, from the NP front end node, the requests for routing information for the ported-in foreign mobile subscribers and responding to the requests with the routing information for the ported-in foreign mobile subscribers.

10. The method of claim 9 wherein the NP front end node processes the requests for routing information for the non-ported foreign mobile subscribers by providing routing numbers corresponding to the networks of the non-ported foreign mobile subscribers.

11. The method of claim 9 wherein the NP front end node routes the requests for routing information for the ported-in foreign mobile subscribers to the at least one HLR back end node.

12. The method of claim 9 wherein the NP front end node comprises a single NP front end node and the at least one HLR back end node comprises a plurality of HLR back end nodes and wherein the NP front-end node, in response to a received request for routing information for a ported-in foreign mobile subscriber, identifies which of the HLR back end nodes contains the subscription information for the ported-in foreign mobile subscriber and forwards the received request for routing information to the identified HLR back end node.

13. A method for providing a number portability (NP) home location register (HLR), the method comprising:
at an NP front end node, receiving requests for routing information for ported-in and non-ported foreign mobile subscribers, making portability determinations in response to the requests, processing or routing the requests based on the portability determinations, and receiving and responding to provide roaming number requests for ported-out mobile subscribers; and
at at least one HLR back end node, performing HLR functions for ported-in foreign mobile subscribers including receiving, from the NP front end node, the requests for routing information for the ported-in foreign mobile subscribers and responding to the requests with the routing information for the ported-in foreign mobile subscribers, wherein the NP front end node receives update messages from a number portability provisioning system as subscribers are ported out of a service provider's network and, in response to the update messages, sends location update messages to donor HLRs to trigger the donor HLRs to point to the NP front end node as the MSC/VLR where the ported-out subscribers are currently registered.

14. The method of claim 13 wherein the NP front end node inserts its entity identifier as the VLR ID in the location update messages.

15. The method of claim 9 wherein the NP front end node is implemented on a signal transfer point (STP) platform configured with a mobile number portability database.

16. The method of claim 9 wherein the at least one HLR back end node comprises an HLR without NP determination capabilities.

17. A non-transitory computer readable medium having stored thereon executable instructions that when executed by the processor of a computer control the computer to perform steps comprising:
at an NP front end node, receiving requests for routing information for ported-in and non-ported foreign mobile subscribers, making portability determinations in response to the requests, processing or routing the requests based on the portability determinations, and receiving and responding to provide roaming number requests for ported-out mobile subscribers, wherein the NP front end node receives the provide roaming number requests for the ported-out mobile subscribers from donor HLRs and responds to the donor HLRs with routing numbers corresponding to networks to which the ported-out mobile subscribers have been ported; and
at at least one HLR back end node, performing HLR functions for ported-in foreign mobile subscribers including receiving, from the NP front end node, the requests for routing information for the ported-in foreign mobile subscribers and responding to the requests with the routing information for the ported-in foreign mobile subscribers.

18. The computer readable medium of claim 17 wherein the NP front end node comprises a single NP front end node and the at least one HLR back end node comprises a plurality of HLR back end nodes and wherein the NP front-end node, in response to a received request for routing information for a ported-in foreign mobile subscriber, identifies which of a plurality of HLR back end nodes contains the subscription information for the ported-in foreign mobile subscriber and forwards the received request for routing information to the identified HLR back end node.

* * * * *